(12) United States Patent
Higashiyama et al.

(10) Patent No.: US 7,064,904 B2
(45) Date of Patent: Jun. 20, 2006

(54) IMAGE PROCESSOR ALLOWING SHOOTING AT CLOSE RANGE

(75) Inventors: Teruyuki Higashiyama, Kawasaki (JP); Satoshi Asada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/037,740

(22) Filed: Jan. 18, 2005

(65) Prior Publication Data
US 2005/0162534 A1 Jul. 28, 2005

(30) Foreign Application Priority Data
Jan. 23, 2004 (JP) ............................. 2004-015783
Jan. 28, 2004 (JP) ............................. 2004-020405

(51) Int. Cl.
*G02B 15/14* (2006.01)
*G03B 13/02* (2006.01)
*H04N 5/262* (2006.01)

(52) U.S. Cl. ..................... 359/697; 359/698; 396/374; 348/240.1

(58) Field of Classification Search ................ 359/676, 359/697, 698, 609, 554; 396/72, 88, 374, 396/79–83; 348/240.01, 240.99, 346, 347, 348/333.02, 333.04
See application file for complete search history.

(56) References Cited

U.S. PATENT DOCUMENTS 6,292,307 B1 * 9/2001 Wu et al. ................... 359/698
6,839,086 B1 * 1/2005 Katagiri ...................... 348/347
6,876,386 B1 * 4/2005 Ito ............................ 348/240.1

FOREIGN PATENT DOCUMENTS

JP 11-183782 A 7/1999

* cited by examiner

*Primary Examiner*—Ricky Mack
*Assistant Examiner*—M. Hasan
(74) *Attorney, Agent, or Firm*—Canon U.S.A. Inc. IP Division

(57) ABSTRACT

An image processor includes a zoom lens for performing optical zooming by moving in a first range, an imaging unit for converting an object image obtained via a zoom lens into an image signal, and an electronic zooming unit for performing an electronic zooming operation on the image signal. The electronic zooming unit performs the electronic zooming operation as a result of moving the zoom lens into a second range when the zoom lens is in the first range and outside the second range.

11 Claims, 10 Drawing Sheets

ZOOM POSITION RANGE
WHERE AMOUNT OF
VIGNETTING IS SMALL

ZOOM POSITION RANGE
WHERE AMOUNT OF
VIGNETTING IS SMALL

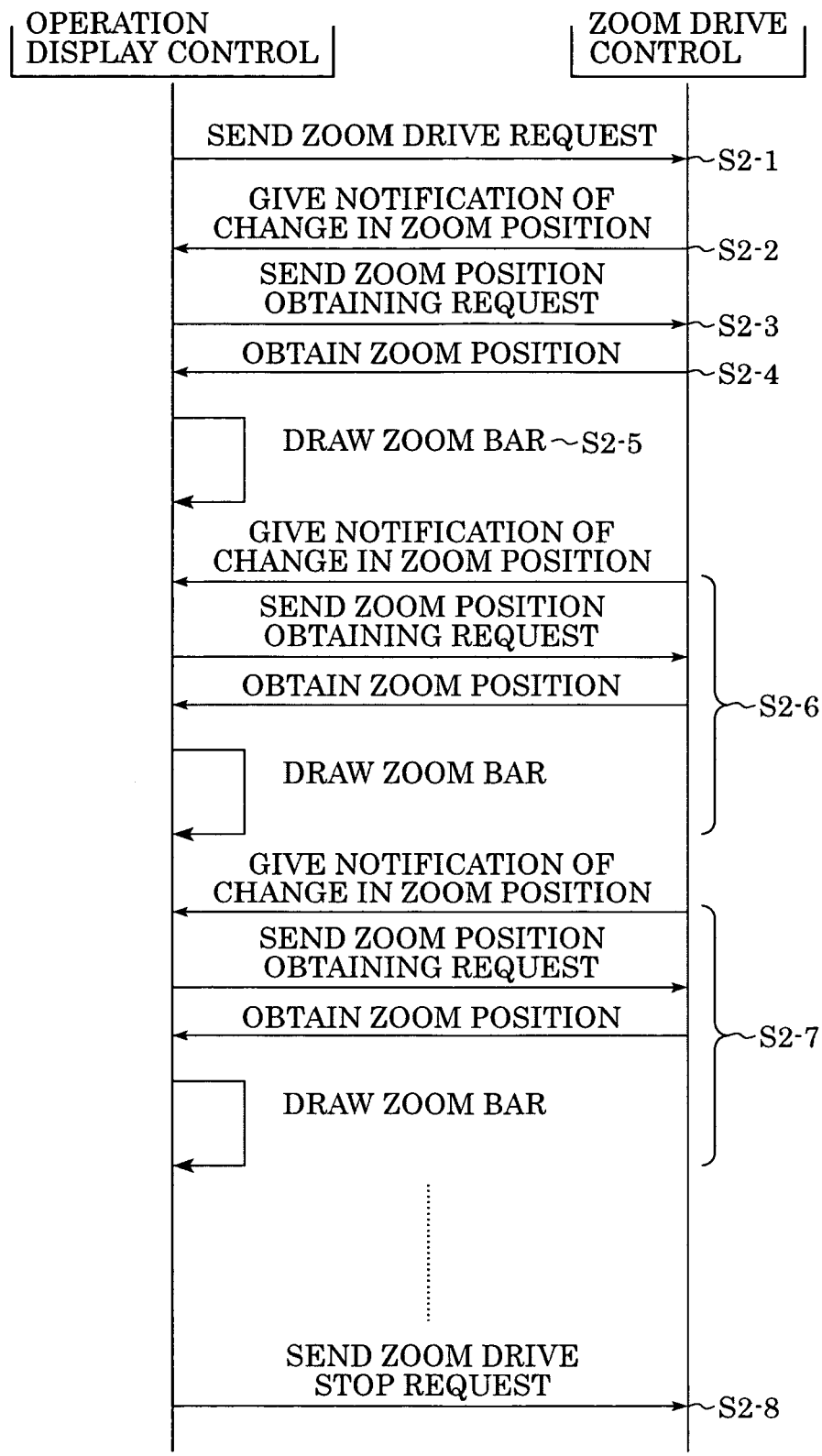

IMAGE PROCESSOR ALLOWING SHOOTING AT CLOSE RANGE

BACKGROUND OF THE INVENTION

1. Field of the Invention

The present invention relates to an image processor for performing an imaging operation on an image and a method for processing an image.

2. Description of the Related Art

Hitherto, an image processor of, for example, an electronic camera for recording and reproducing a static image or a dynamic image by using a memory card having a solid-state memory element as a recording medium has already been commercially available. In addition, an electronic camera, such as a digital camera/digital video, provided with a macro mode for close-up shooting of an object has also been commercially available.

In such electronic cameras, when an object that is situated closer than a predetermined distance is brought into focus by a mounted shooting lens, vignetting occurs depending upon the type of shooting lens. This means that light no longer enters a peripheral portion of the lens. Therefore, the shortest shooting distance is usually set at a distance where vignetting does not occur.

Related image processors of such related electronic cameras have a problem in that shooting of an object can be performed only up to a distance at which vignetting does not occur. Therefore, such related image processors of, for example, electronic cameras are not capable of meeting the demand for shooting an object at a distance that is closer than the distance at which vignetting occurs.

SUMMARY OF THE INVENTION

The present invention has been made in consideration of the above situation, and to make it possible for a user to easily view a zooming state.

In one aspect of the present invention, an image processor includes a zoom lens configured to obtain an object image by performing optical zooming, the zoom lens being movable within a first range, an imaging unit for converting the object image obtained via the zoom lens into an image signal, an electronic zooming unit for performing an electronic zooming operation on the image signal, and a controlling unit, in a case where the zoom lens is outside a second range narrower than the first range, moving the zoom lens so as to be in the second range and controlling the electronic zooming unit to perform the electronic zooming operation.

In another aspect, a method for processing an image includes an optical zooming step of moving a zoom lens in a first range in order to obtain an object image; an imaging step of converting the object image obtained in the optical zooming step into an image signal; and a controlling step of performing an electronic zooming operation on the image signal by moving the zoom lens into a second range narrower than the first range in a case where the zoom lens is outside the second range.

In yet another aspect, an imaging method provided with a first mode in which lens driving is capable of being carried out in a first range and a second mode in which the lens driving is capable of being carried out in a second range that is narrower than the first range, includes an obtaining step of obtaining an object image with a zoom lens; an imaging step of converting the object image obtained in the obtaining step into an image signal; an electronic zooming step of performing electronic zooming on the image signal; a first displaying step of displaying an image that has been subjected to the electronic zooming in the electronic zooming step; and a controlling step of performing, in a case where the zoom lens is outside the second range and the second mode is set, a controlling operation so that the zoom lens is moved into the second range and an image is enlarged by the electronic zooming in the electronic zooming step in order to display the enlarged image in the first displaying step.

In yet still another aspect, an imaging device provided with a first mode in which lens driving is capable of being carried out in a first range and a second mode in which the lens driving is capable of being carried out in a second range that is narrower than the first range, includes a zoom lens configured to obtain an object image; an imaging unit for converting the object image obtained via the zoom lens into an image signal; an electronic zooming unit for performing an electronic zooming operation on the image signal; a first displaying unit for displaying an image subjected to the electronic zooming operation by the electronic zooming unit; and a controlling unit, in a case where the zoom lens is outside the second range and the second mode is set, controlling the zoom lens to move into the second range and controlling the electronic zooming unit to enlarge an image in order to display the enlarged image on the first displaying unit.

In yet still another aspect, a method for controlling an imaging device comprising an optical zoom lens for performing zooming, an imaging unit for converting an object image that has passed through the optical zoom lens into an electrical image signal, and an auto-focusing unit for automatically bringing an object into focus, including an obtaining step of obtaining a current zoom position, and a displaying step of displaying a first bar for indicating the current zoom position and a zoom area that is not suitable for auto-focus shooting at close range.

In yet still another aspect, a method for controlling an imaging device comprising an optical zoom lens for performing zooming, an imaging unit for converting an object image that has passed through the optical zoom lens into an electrical image signal, and an auto-focusing unit for automatically bringing an object into focus, includes an obtaining step of obtaining a current zoom position, and a displaying step of indicating that the current zoom position is in a zoom area that is not suitable for auto-focus shooting at close range when the current zoom position is in the zoom area.

In yet still another aspect, a method for controlling an imaging device comprising an optical zoom lens for performing zooming, an imaging unit for converting an object image that has passed through the optical zoom lens into an electrical image signal, and an auto-focusing unit for automatically bringing an object into focus, includes a first displaying step of displaying a first bar for indicating the current zoom position, and a second displaying step of displaying a second bar in parallel with the first bar, the second bar being shorter than the first bar.

Other features and advantages of the present invention will become apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates a controlling operation for carrying out the embodiment.

DESCRIPTION OF THE EMBODIMENTS

Hereunder, embodiments of the present invention will be described with reference to the relevant drawings.

Figure 1:
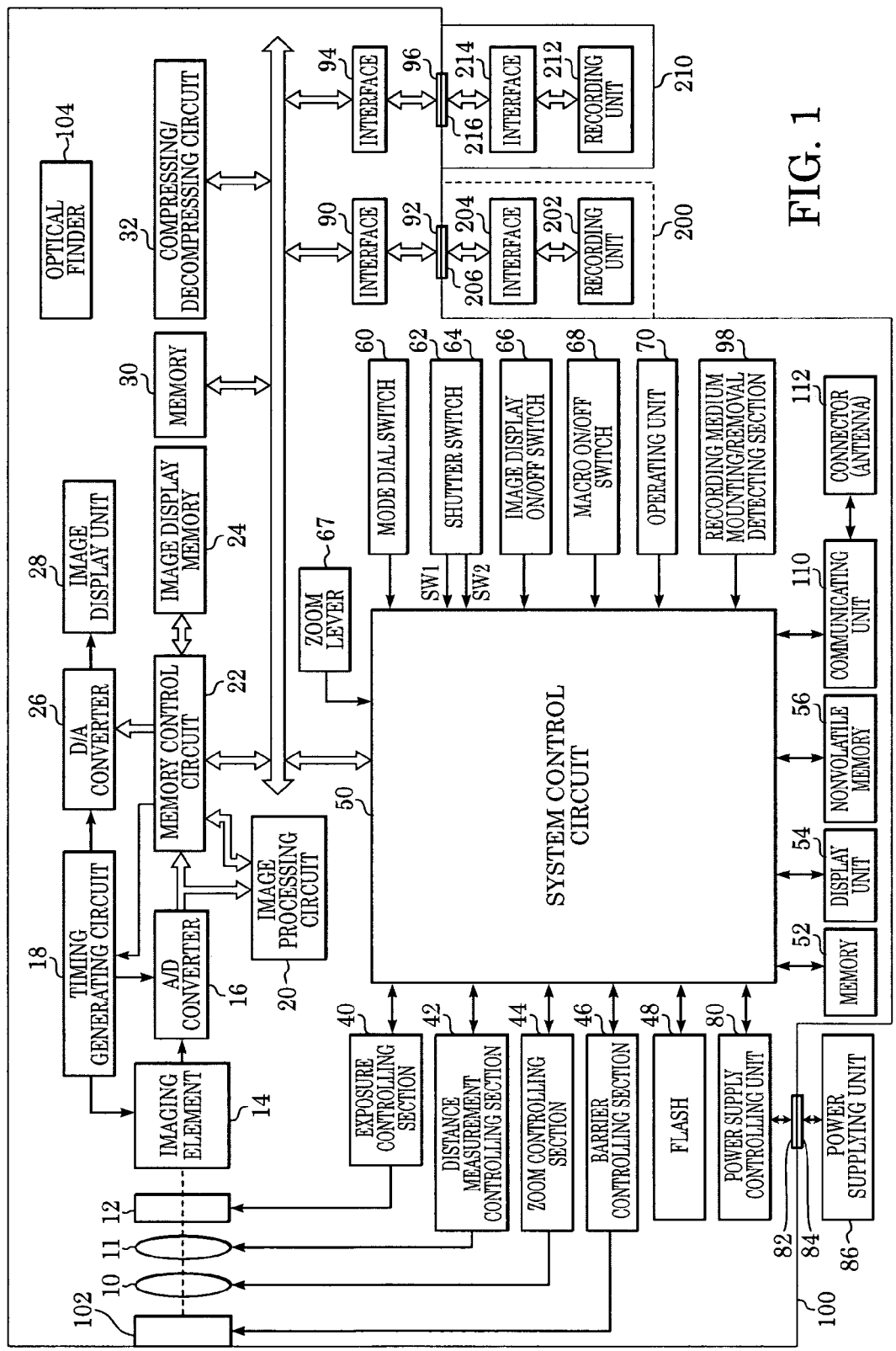
FIG. 1 is a block diagram of the structure of an embodiment of the present invention.

FIG. 1 shows the structure of one embodiment of the present invention. In FIG. 1, reference numeral 100 denotes an image processor.

Reference numeral 10 denotes a zoom lens, reference numeral 11 denotes a focusing lens, reference numeral 12 denotes a shutter for opening and closing an aperture, reference numeral 14 denotes an imaging element for converting an optical image into an electrical image signal, and reference numeral 16 denotes an analog-to-digital (A/D) converter for converting an analog signal output from the imaging element 14 into a digital signal.

Reference numeral 18 denotes a timing generation circuit for supplying a clock signal and a control signal to the A/D converter 16 and a digital-to-analog (D/A) converter 26. The timing generation circuit 18 is controlled by a memory control circuit 22 and a system control circuit 50.

Reference numeral 20 denotes an image processing circuit for performing a predetermined pixel interpolating operation or a predetermined color converting operation on data from the A/D converter 16 or from the memory control circuit 22.

The image processing circuit 20 performs a predetermined calculating operation by using image data obtained by imaging so as to carry out a pre-flashing (EF) operation, an automatic exposing (AE) operation, and an auto-focusing (AF) operation based on a through-the-lens (TTL) method, so that the system control circuit 50 controls exposure controlling section 40 and distance measurement controlling section 42 on the basis of the obtained calculation result.

The image processing circuit 20 also performs the predetermined calculating operation by using the image data obtained by imaging in order to perform an auto-white balancing (AWB) operation based on the TTL method on the basis of the obtained calculation result.

The memory control circuit 22 controls the A/D converter 16, the timing generation circuit 18, the image processing circuit 20, an image display memory 24, the D/A converter 26, a memory 30, and a compressing/decompressing circuit 32.

The data from the A/D converter 16 is written to the image display memory 24 or to the memory 30 via the image processing circuit 20 and the memory control circuit 22 or via the memory control circuit 22.

Reference numeral 28 denotes an image display unit including, for example, TFT or LCD. Display image data written to the image display memory 24 is displayed on the image display unit 28 via the D/A converter 26.

Successively displaying image data obtained by imaging on the image display unit 28 makes it possible to realize an electronic finder function.

The image display unit 28 may be turned on and off any time by a command from the system control circuit 50. When it is turned off, power consumption of the image processor 100 can be considerably reduced.

The memory 30 stores a static image or a dynamic image. The memory 30 has enough storage capacity for storing a predetermined number of sheets of static images and dynamic images of a predetermined amount of time.

Accordingly, even if panoramic shooting or successive shooting of a plurality of sheets of static images is carried out, it is possible to write a large number of images to the memory 30 at a high speed.

The memory 30 can be used as a working area of the system control circuit 50.

The compressing/decompressing circuit 32 compresses or decompresses image data by, for example, adaptive discrete cosine transformation (ADCT). It reads an image stored in the memory 30 and compresses or decompresses the read image in order to write the data that has been processed to the memory 30.

The exposure controlling section 40 controls the shutter 12 for opening and closing an aperture, and provides a flash controlling function by operating with a flash 48.

The distance measurement controlling section 42 controls the focusing of the focusing lens 11. Reference numeral 44 denotes zoom controlling section for controlling the zooming of the zoom lens 10, and reference numeral 46 denotes barrier controlling section for controlling the operation of a protecting unit 102 that is a barrier.

The flash 48 has an AF auxiliary light projecting function and a flash controlling function.

The exposure controlling section 40 and the distance measurement controlling section 42 are controlled by the TTL method. The system control circuit 50 controls the exposure controlling section 40 and the distance measurement controlling section 42 on the basis of calculation results obtained by performing calculation on image data obtained after imaging by the image processing circuit 20.

The system control circuit 50 controls the entire image processor 100. Reference numeral 52 denotes a memory for storing, for example, programs, variables, and constants for operating the system control circuit 50.

Reference numeral 54 denotes a display unit of, for example, a speaker or a liquid crystal display device for displaying, for example, a message or an operation state by using characters, images, sound, or the like, in accordance with the execution of the program at the system control circuit 50. At least one display unit 54 is disposed near an operating unit of the image processor 100 so that the at least one display unit 54 can be easily seen, and includes a combination of, for example, an LCD, an LED, and a sound-generating element.

Some of the operations of the display unit 54 are provided by an optical finder 104. For example, the LCD of the display unit 54 provides a display of single-shot/successive shooting, a self-timer display, a display of the compression ratio, a display of the number of recording pixels, a display of the number of recording sheets, a display of the remaining number of sheets capable of being used for shooting, a display of the shutter speed display, a display of the diaphragm stop, a display of exposure correction, a flash display, a red-eye reduction display, a macro shooting display, a buzzer setting display, a display of a clock remaining battery power, a display of the remaining battery power, an error display, a display of information by numbers in more than one digit, a display of the mounting/removal state of recording media 200 and 210, a communication I/F operation display, and a display of the date and time.

The optical finder 104 provides, for example, an in-focus display, a motion blur warning display, a flash charging display, a display of the shutter speed, a display of the diaphragm stop, and an exposure correction display among the display contents provided by the display unit 54.

Reference numeral 56 denotes a nonvolatile memory, such as an EEPROM, which allows data to be electrically erased and recorded.

Reference numerals 60, 62, 64, 66, 68, and 70 denote operating sections for inputting various operation commands of the system control circuit 50. The operating sections 60, 62, 64, 66, 68, and 70 are, for example, a switch, a dial, a touch panel, a pointer making use of sight-line detection, and a sound recognizer, which are used singly or in combination.

The operating sections will be described in more detail.

The operating section 60 is a mode dial switch for switching between various functional modes, such as a power supply off mode, an automatic shooting mode, a shooting mode, a panoramic shooting mode, a reproduction mode, a multi-screen reproduction/deletion mode, and a PC connection mode.

The operating section 62 is a shutter switch SW1 that is switched on while a shutter button (not shown) is being operated in order to give a command to start operations, such as an EF operation, an AWB operation, an AE operation, and an AF operation.

The operating section 64 is a shutter switch SW2 that is switched on when the operation of the shutter button (not shown) is completed in order to given a command to start an exposing operation, a developing operation, and a recording operation. In the exposing operation, a signal read from the imaging element 14 is used to write image data to the memory 30 via the A/D converter 16 and the memory control circuit 22. The developing operation is carried out by calculations at the image processing circuit 20 and the memory control circuit 22. In the recording operation, the image data is read from the memory 30, compressed at the compressing/decompressing circuit 32, and written to the recording medium 200 or 210.

The operating section 66 is an image display on/off switch for setting the image display unit 28 on or off.

This function of the operating section 66 makes it possible to save electric power by intercepting the supply of electric current to the image display unit 28 when carrying out shooting with the optical finder 104.

The operating section 68 is a macro on/off switch for setting a close-up shooting mode on or off.

The operating section 70 is an operating unit including, for example, various buttons and a touch panel. Examples of the various buttons are a menu button, a set button, a multi-screen reproduction new-page button, a flash setting button, a single-shooting/successive-shooting/self-timer switching button, a menu movement plus button, a menu movement minus button, a reproduction image movement plus button, a reproduction image minus button, a shooting quality selection button, an exposure correction button, and a date/time setting button.

Reference numeral 80 denotes a power supply controlling unit including a battery detecting circuit, a DC—DC converter, and a switching circuit for switching to a block to be energized. The power supply controlling unit 80 detects whether or not a battery is installed, the type of battery, and the remaining battery power in order to control the DC—DC converter on the basis of the detection result and a command from the system control circuit 50, so that the necessary voltage is applied to each part, including the recording media, for the required period of time.

Reference numerals 82 and 84 denote connectors, and reference numeral 86 denotes power supplying unit including, for example, an AC adapter and a primary battery (such as an alkaline battery or a lithium battery) or a secondary battery (such as an NiCd battery, a NiMH battery, or a Li battery).

Reference numerals 90 and 94 denote interfaces for allowing connection to the recording media, such as memory cards or hard discs. Reference numerals 92 and 96 denote connectors for allowing connection to the recording media. Reference numeral 98 denotes recording medium mounting/removal detecting section for detecting whether or not the recording medium 200 and/or the recording medium 210 are/is mounted to the connector 92 and/or the connector 96.

In the embodiment, the interfaces and connectors, which are mounted to the recording media, are provided in pairs, but, obviously, do not have to be provided in pairs. They may be provided singly or in numbers greater than two. In addition, interfaces and connectors of different specifications may be used in combination.

Interfaces and connectors in conformity with specifications of, for example, PCMCIA cards or compact flash (CF) cards may be used for the above-described interfaces and connectors.

When the interfaces 90 and 94 and the connectors 92 and 96 are in conformity with the specifications of, for example, PCMCIA cards or CF cards, it is possible to transfer image data and control information included with the image data between the image processor 100 and peripheral devices of, for example, another computer or printer by connecting any one of various communication cards such as a LAN card, a modem card, a USB card, an IEEE1394 card, a P1284 card, a SCSI card, and a PHS communication card.

The protecting unit 102, which is a barrier, prevents an imaging unit including the lens 10 of the image processor 100 from becoming dirty or damaged by covering the imaging unit.

Shooting can be carried out without using the electronic finder function of the image display unit 28, that is, by only using the optical finder 104. The optical finder 104 provides some of the functions of the display unit 54, such as an in-focus display function, a motion blur warning display function, a flash charging display function, a shutter speed display function, a diaphragm stop display function, and an exposure correction display function.

Reference numeral 110 denotes a communicating unit having various communication functions, such as RS232C, USB, IEEE1394, P1284, SCSI, modem, LAN, and radio communication.

Reference numeral 112 denotes a connector for connecting the image processor 100 to another device by the communicating means 110. Reference numeral 112 denotes an antenna when radio communication is carried out.

The recording medium 200 can be, for example, a memory card or a hard disc.

The recording medium 200 includes a recording unit 202, an interface 204 for allowing connection to the image processor 100, and a connector 206 for allowing connection to the image processor 100. The recording unit 202 includes, for example, a semiconductor memory or a magnetic disc.

The other recording medium 210 can be, for example, a memory card or a hard disc.

The recording medium 210 includes a recording unit 212, an interface 214 for allowing connection to the image processor 100, and a connector 216 for connection to the image processor 100. The recording unit 212 includes, for example, a semiconductor memory or a magnetic disc.

The operation of the image processor 100 of the embodiment will be described with reference to FIGS. 2 to 5.

Figure 2:
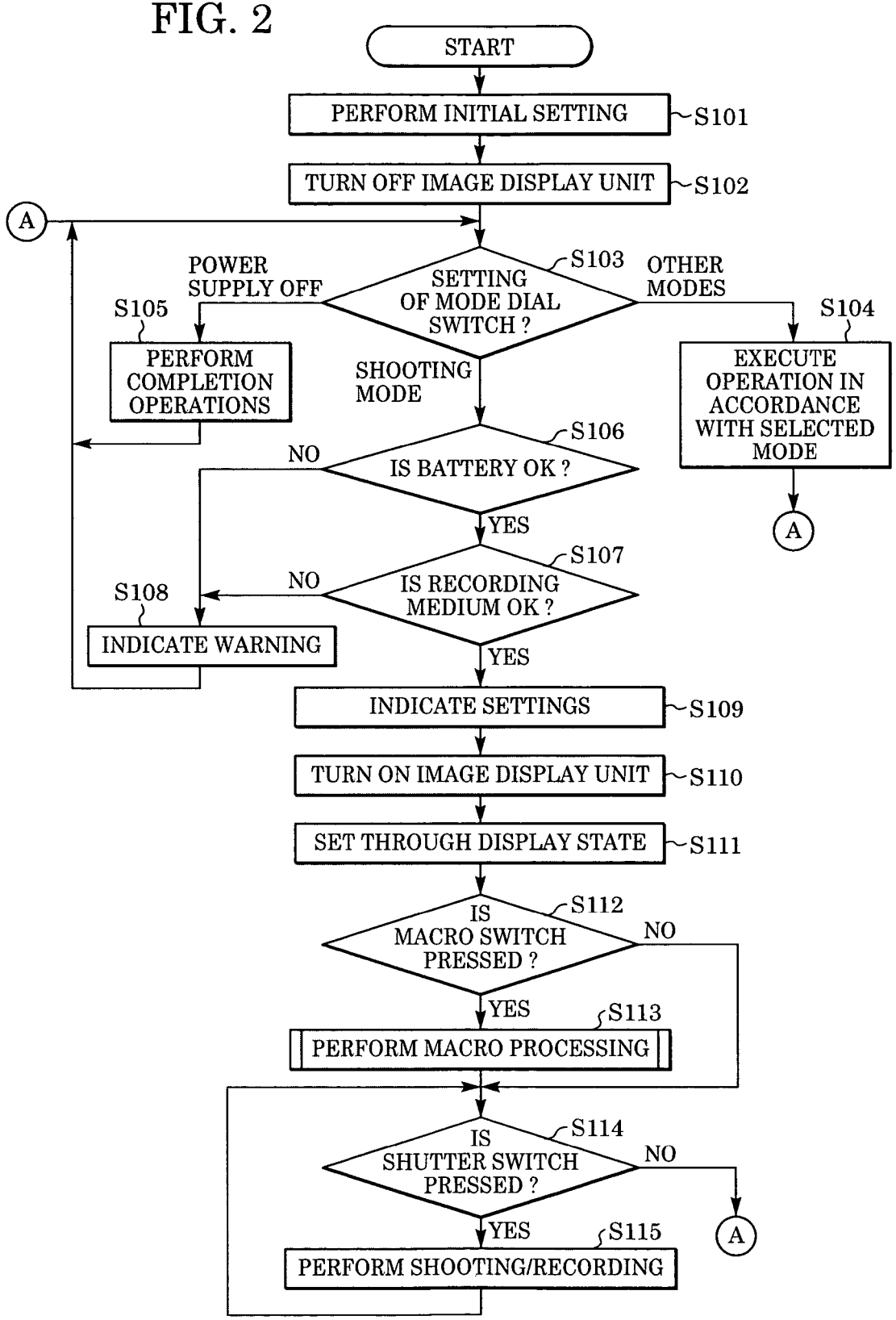
FIG. 2 is a flow chart of a main routine in the embodiment.

FIG. 2 is a flow chart of a main routine of the image processor 100 of the embodiment.

The operation of the image processor 100 will be described with reference to FIG. 2.

By power activation when, for example, a battery is replaced, the system control circuit 50 initializes, for example, a flag or a control variable in Step S101, and, then, sets the image display unit 28 in an off state (initial state) in Step S102.

When the system control circuit 50 determines that the mode dial switch 60 is set in an off position in Step S103, predetermined completion operations are carried out in Step S105, and the process returns to Step S103. The predetermined completion operations include changing the display state of each display unit to a completion state, protecting the imaging unit by closing the barrier (that is, the protecting unit 102), recording set values and parameters, including required flags and control variables, and a setting mode in the nonvolatile memory 56, and intercepting unnecessary power supply to each part of the image processor 100 including the image display unit 28 by the power supply controlling unit 80.

If the mode dial switch 60 is set in a shooting mode in Step S103, the process proceeds to Step S106.

If the mode dial switch 60 is set in any other mode in Step S103, the system control circuit 50 executes an operation in accordance with the selected mode in Step S104. When this operation is completed, the process returns to Step S103.

In Step S106, the system control circuit 50 determines whether or not the remaining amount of power and operating state of the power supplying unit 86 cause a problem in the operation of the image processor 100 by the power supply controlling unit 80. If it determines that they do cause a problem in Step S106, the display unit 54 provides a predetermined warning by using an image or sound in Step S108. Then, the process returns to Step S103.

If the system control circuit 50 determines that they do not cause any problem in Step S106, it determines whether or not the operation state of the recording medium 200 or the recording medium 210 causes a problem in the operation of the image processor 100, in particular, in the recording/reproducing of data onto/from the recording medium in Step S107. If it determines that it does cause a problem, the display unit 54 provides a predetermined warning by using an image or sound in Step S108. Then, the process returns to Step S103.

If the system control circuit 50 determines that the operation state of the recording medium 200 or the recording medium 210 does not cause a problem in Step S107, the display unit 54 displays various setting states of the image processor 100 by using an image or sound in Step S109. If the image display unit 28 is on, it displays the various setting states of the image processor 100 by an image or sound.

The system control circuit 50 turns on the display unit 28 in Step S110 in order to set a through display state for successively displaying image data obtained after imaging in Step S111. Then, the process proceeds to Step S112.

In the through display state, data successively written to the image display memory 24 via the imaging element 14, the A/D converter 16, the image processing circuit 20, and the memory control circuit 22 is successively displayed on the image display unit 28 via the memory control circuit 22 and the D/A converter 26 in order to carry out the electronic finder function.

The system control circuit 50 determines whether or not the macro on/off switch 68 is pressed in Step S112. If it is pressed, macro processing is carried out in Step S113. Then, the process proceeds to Step S114.

The macro processing (Step S113) is described below in detail with reference to FIG. 3.

If the macro on/off switch 68 is not pressed, the process proceeds to Step S114. In Step S114, the state of the shutter switch SW is determined. If it is pressed, shooting/recording is carried out in Step S115. The details of the shooting/recording are widely known. Therefore, the shooting/recording will not be particularly described. If the shutter switch SW is not pressed, the process returns to Step S103.

The macro processing of Step S113 in FIG. 2 will be described with reference to FIGS. 3 to 5.

Figure 4:
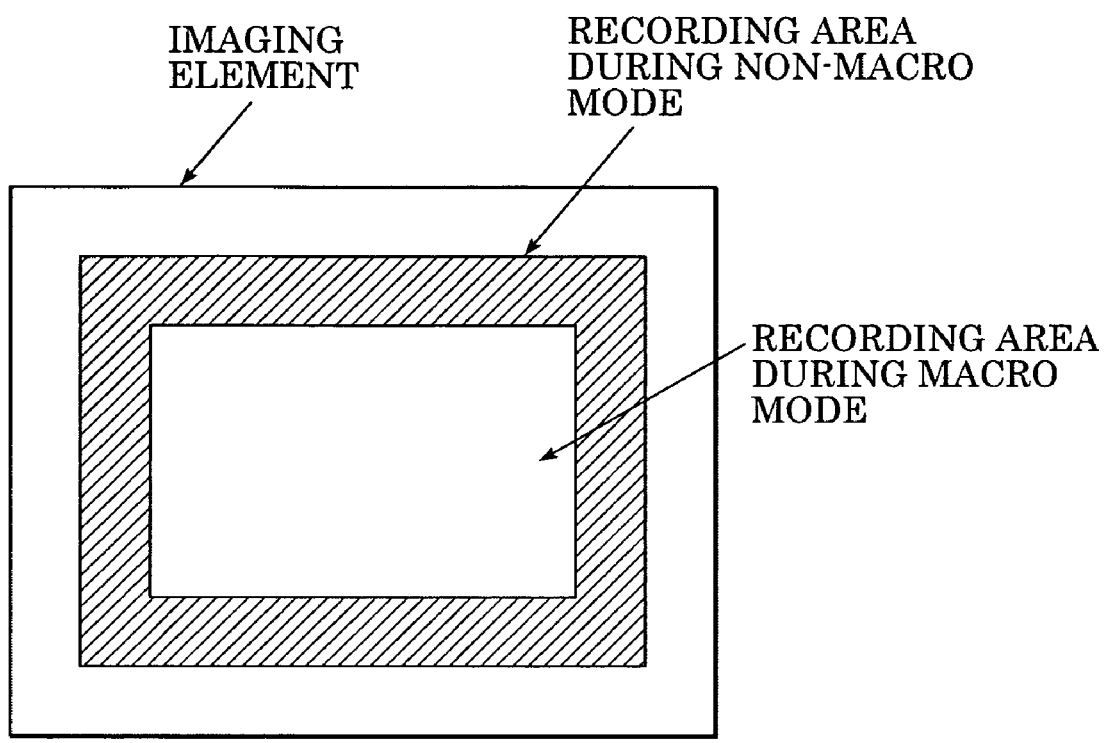
FIG. 4 shows recording areas of an imaging element in the embodiment during macro mode and non-macro mode, respectively.

FIG. 4 shows recording areas of the imaging element during macro mode and non-macro mode, respectively. An image signal of an area that is smaller during the macro mode than during the non-macro mode is recorded. When the closest object is brought into focus, light no longer enters the peripheral portion of the imaging element 14, causing vignetting to occur. Therefore, of portions of the image signal from the imaging element 14, only the portion of the image signal at the central portion of the imaging element 14 where vignetting does not occur is recorded. In addition, the electronic finder displays only the portion of the image within an area where vignetting does not occur. A function of enlarging and displaying a portion of the image signal in correspondence with a portion of the imaging element is widely known as electronic zooming. A method for recording only a portion of the image signal at a portion of the imaging element is also well known along with the electronic zooming. An area of the imaging element where vignetting does not occur is previously stored in the nonvolatile memory 56.

Figure 5A:
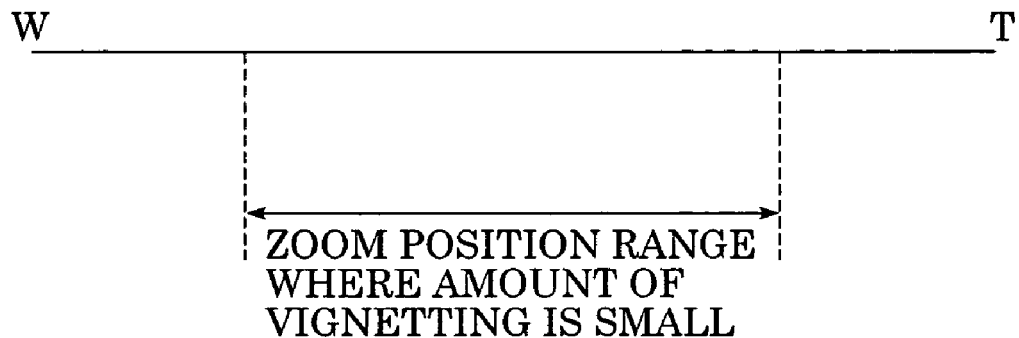
FIGS. 5A–C illustrate a zoom position range in which vignetting does not easily occur in the embodiment.
Figure 5B:
Figure 5C:
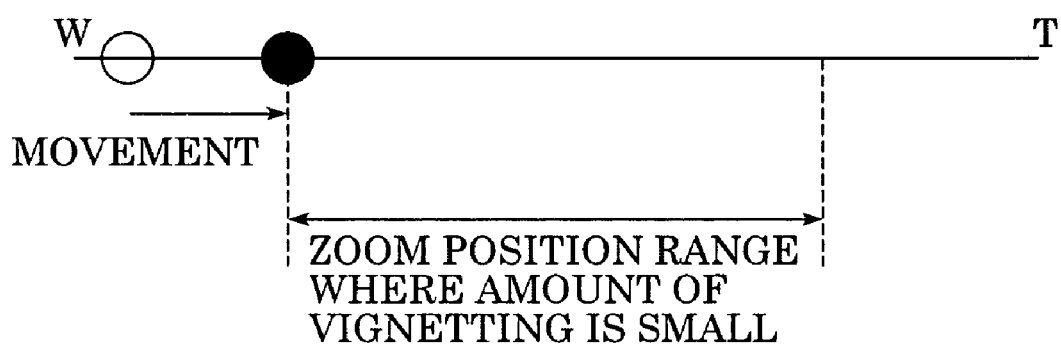

FIGS. 5A–C show the relationship between a zoom position range and vignetting. In FIGS. 5A–C, the amount of vignetting is large at a wide-angle end (W) and a telephoto end (T). In the case where the zoom lens 10 is at a black dot position in FIG. 5B, when macro processing is to be carried out, the zoom lens 10 is moved to a black dot position shown in FIG. 5C where the amount of vignetting is small. In accordance with the characteristics of the lens, a range where the amount of vignetting is small is previously stored in the nonvolatile memory 56. The system control circuit 50 moves the zoom lens 10 to a zoom position that is closest to the current zoom position in the range where the amount of vignetting is small.

Figure 3:
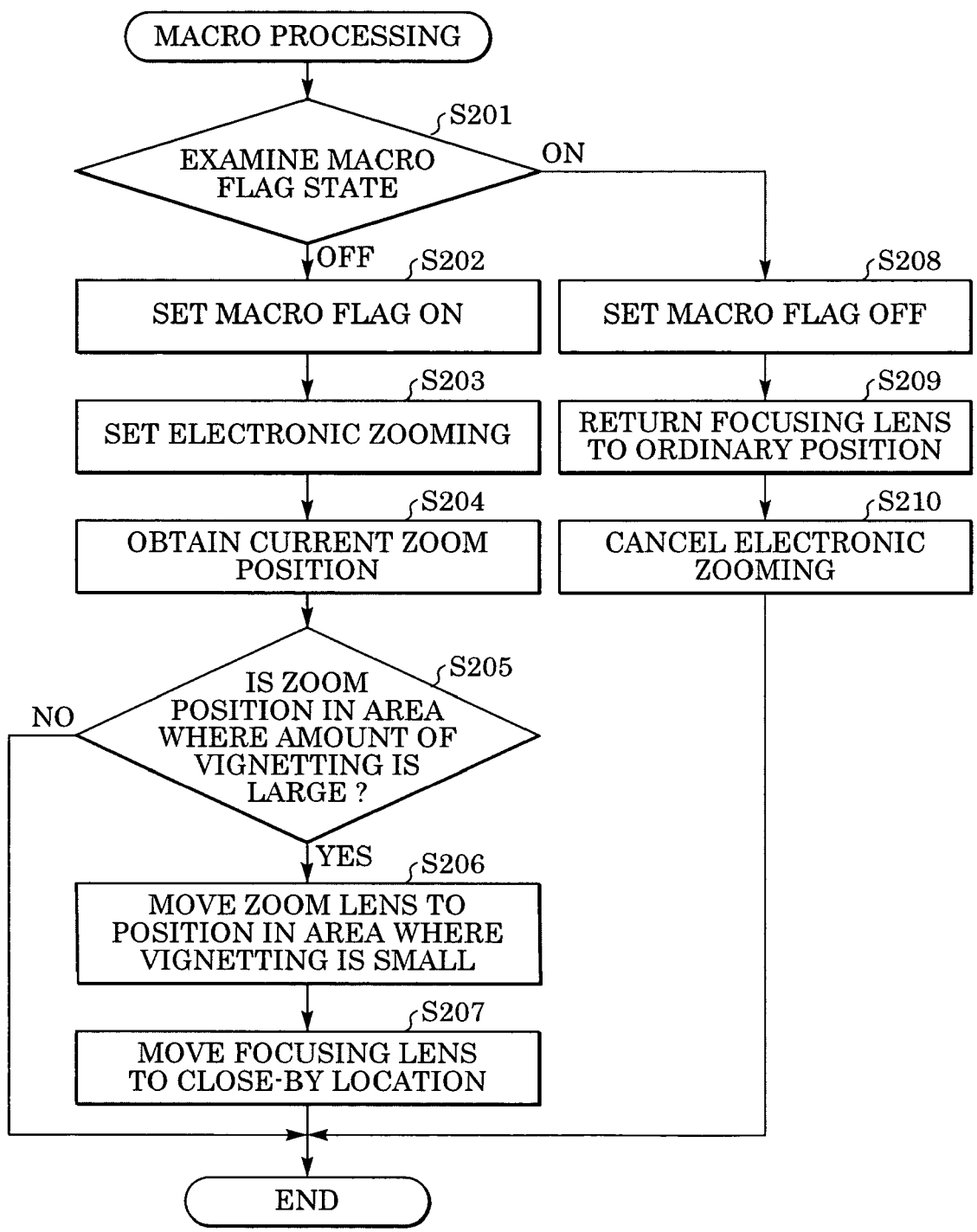
FIG. 3 is a flow chart of macro processing in the embodiment.

FIG. 3 is a flow chart illustrating in detail the macro processing in Step S113 in FIG. 2.

In order to determine whether or not the image processor 100 is currently in the macro mode, the system control circuit 50 examines a macro flag state in Step S201. If the macro flag is off, the process proceeds to Step S202 in order to set the macro mode on. When the macro flag is set on in Step S202, an electronic zooming mode is set in Step S203. Setting the electronic zooming mode causes the image display unit 28 to successively display only a portion of image data, obtained after imaging, where vignetting does not occur.

Next, the system control circuit 50 obtains the current zoom position in Step S204, and determines whether or not the current zoom lens position is in an area where the amount of vignetting is large in Step S205. If it is not in the area where the amount of vignetting is large, the processing ends. In contrast, if it is in the area where the amount of vignetting is large, the zoom lens 10 is moved to a position that is closest to the current zoom position in an area where the amount of vignetting is small in Step S206. Then, the focusing lens 11 is moved towards the close-by location in Step S207. The focusing lens 11 is moved towards the close-by location in accordance with the lens characteristics, that is, for example, so that it focuses on the object at about 5 cm.

In contrast, if the macro flag is on in Step S201, the system control circuit 50 cancels the macro mode. In Step S208, the macro flag is set off. Then, in Step S209, the focusing lens 11 is returned to its ordinary position. When the focusing lens 11 is returned to its ordinary position, vignetting no longer occurs at the peripheral portion of the imaging element. Therefore, the electronic zooming mode is cancelled in Step S210.

<Display of Zoom Position>

Figure 6A:
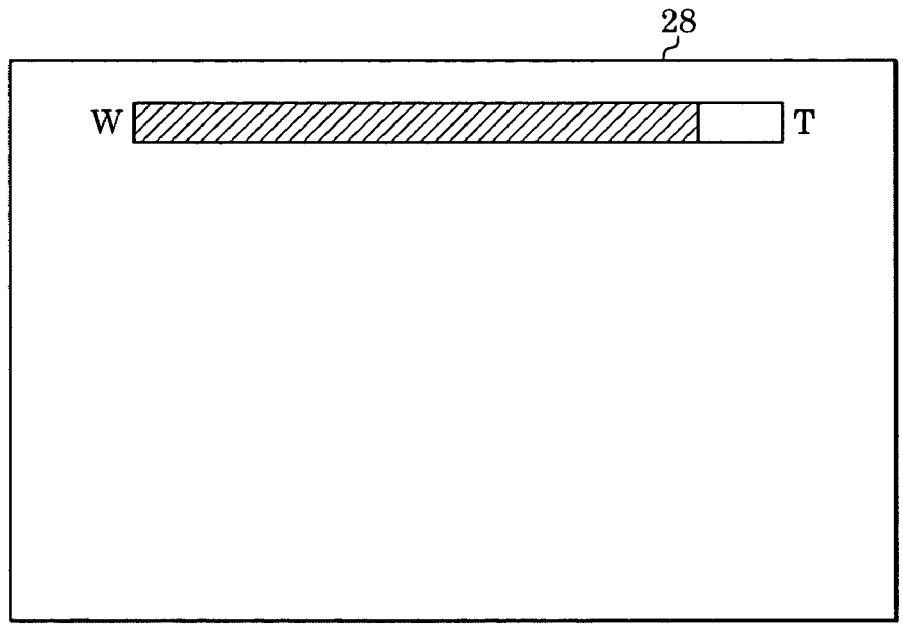
FIGS. 6A–C show an example of a display of a zoom bar in the embodiment.
Figure 6B:
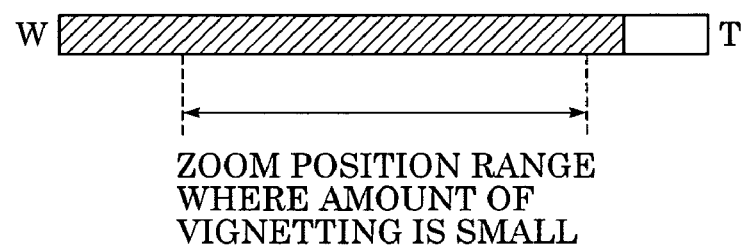
Figure 6C:
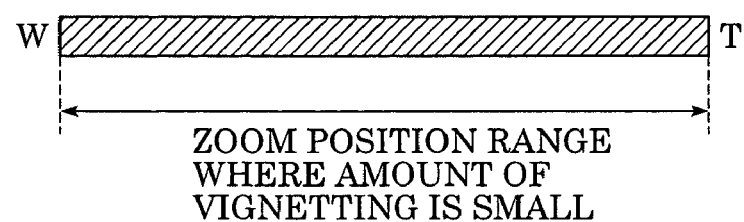

FIGS. 6A–C show an example of a display of a zoom bar on the image display unit 28. The zoom bar is displayed to indicate the current zoom position. FIG. 6A shows the display of the zoom bar. W denotes a wide-angle end and T denotes a telephoto end. In FIG. 6A, the zoom lens is disposed near the telephoto end. In other words, when a zoom lever 67 is operated (shown in FIG. 1), the system control circuit 50 drives the zoom lens 10 and displays the zoom bar as shown in FIG. 6A.

If the zoom bar is displayed as shown in FIG. 6B when the macro mode is off, setting the macro mode on causes the zoom lens to move to a location that is closest to the telephoto end in a range where vignetting does not occur easily and the zoom bar to be displayed as shown in FIG. 6C. In other words, the width of the operational zoom position range is changed (that is, increased in this case) by the zoom lever without changing a length X of the zoom bar. FIG. 6C shows the zoom bar with the length X, with a location that is closest to the wide-angle side in the area where vignetting does not easily occur being the telephoto side and a location that is closest to the telephoto side in the area where vignetting does not easily occur being the wide-angle side. When the macro mode is set on in the state shown in FIG. 6B, the zoom lens is moved to the location that is closest to the telephoto side in the area where vignetting does not easily occur, so that the zoom bar is displayed with the length X, with this location being the telephoto end. Therefore, since the zoom bar is displayed with the length X in both cases, this method of displaying the zoom lens position is effective in allowing a user to easily confirm the current zoom lens position in the zoom bar.

When the zoom lever 67 is operated when the macro mode is on, the system control circuit 50 allows the zoom lens 10 to be driven only in the range where vignetting does not easily occur.

Figure 7A:
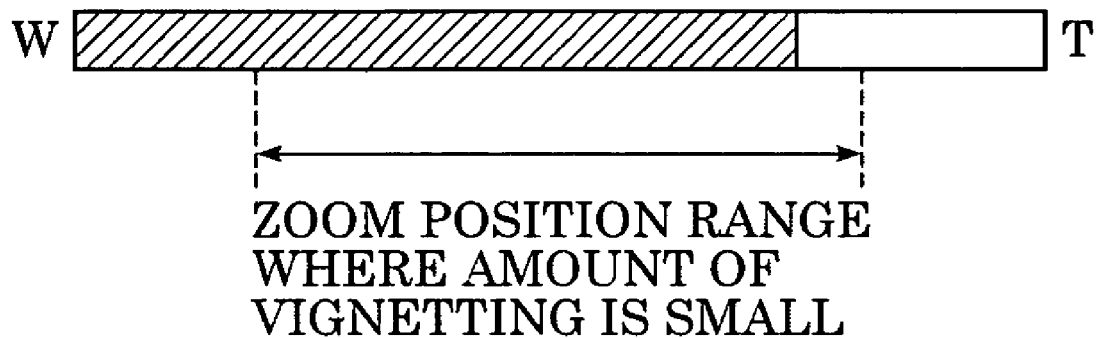
FIGS. 7A–B show another example of a display of a zoom bar in the embodiment.
Figure 7B:
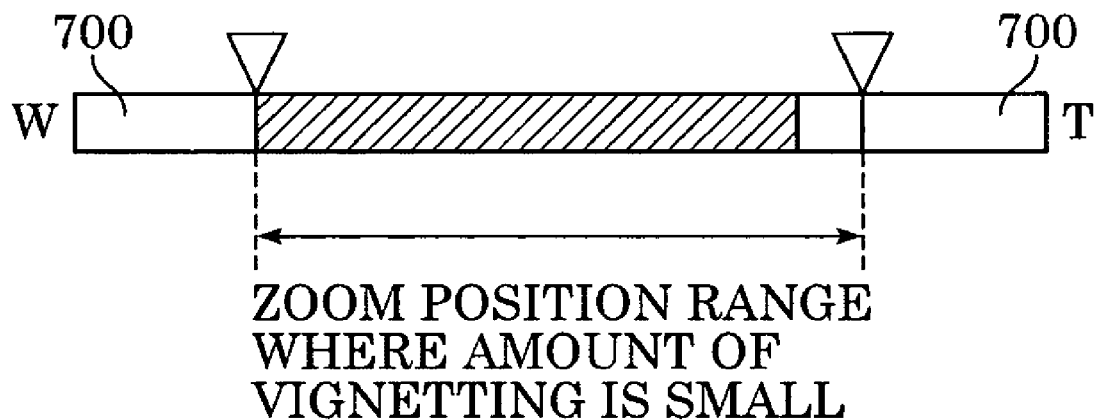

FIGS. 7A–B show another example of a display of a zoom bar on the image display unit 28.

If the zoom bar shown in FIG. 7A is displayed when the macro mode is off, setting on the macro mode causes a zoom bar shown in FIG. 7B to be displayed. In FIG. 7B, triangles mark boundaries of a range where vignetting does not easily occur in the zoom bar. When the macro mode is on, the zoom lens moves only in the range where vignetting does not easily occur. A range in which the zoom lens does not move (that is, a range where the amount of vignetting is large) when the macro mode is on is completely colored yellow in order to express that the zoom lens does not move, with a length X of the zoom bar being unchanged. The zoom bar has the same length X regardless of whether the macro mode is on or off. This is effective in allowing the user to easily confirm the current zoom lens position regardless of whether the macro setting is on or off.

In the embodiment, although the range in which the zoom lens does not move when the macro mode is on is completely colored yellow, it may be colored with any other recognizable color, such as blue, red, or green. The range may also have a stripe pattern.

<ON/OFF of Image Display Unit 28>

Although, in the embodiment, the image display unit 28 is described as always being on, the image display unit 28 may be constructed so as to be capable of being turned on or off by the image display on/off switch 66. The image display unit 28 may be such as to cancel the macro mode when it is turned off and to disallow the setting of the macro mode when it is off. Since the electronic finder and the zoom bar are not displayed when the image display unit 28 is off, a user cannot know whether the macro mode is set. Therefore, when the image display unit 28 is off, it is possible to prevent improper operation by not allowing macro shooting.

<Display of Zoom Position in Macro Mode>

A related technology which considers the operability for a user when there is an optical zoom area in which AF shooting (macro AF) cannot be carried out at close range is provided. Such a technology is disclosed in, for example, Japanese Patent Laid-Open No. 11-183782. In this technology, when a macro AF mode is selected, a lens unit is moved and placed within a controllable zoom area range when an AF macro control cannot be optically carried out in the zoom area. Even if it is impossible to carry out the macro AF control, a user can select a state in which the zoom area is not changed in order to cause a display device to shine in accordance with a macro mode state, thereby preventing improper operation.

However, it is difficult to inform the user of whether or not the optical lens unit is within the zoom area in which the macro AF control cannot be carried out.

Figure 9:
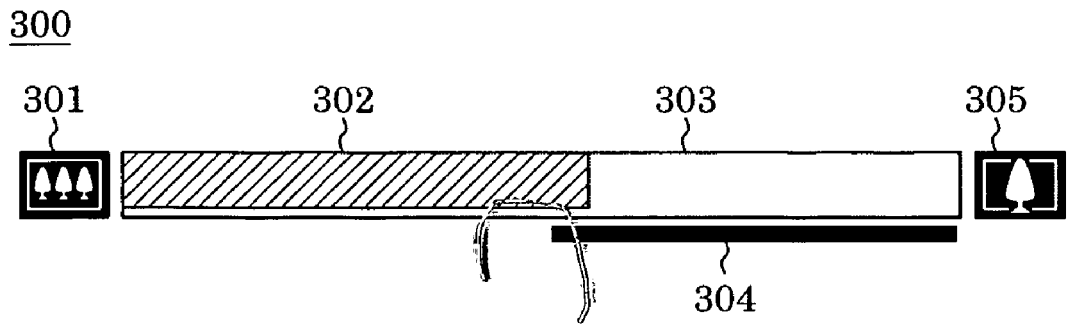
FIG. 9 illustrates a zoom bar.

FIG. 9 illustrates an example of a structure of a zoom bar displayed on the display unit 54 in carrying out the embodiment. Reference numeral 300 denotes the entire zoom bar including icons 301 to 305 for indicating that the left side of the zoom bar is a zooming wide-angle end and the right side of the zoom bar is a telephoto end. The icon 303 is a bar portion indicating the entire zooming operation area. The icon 302 is a bar portion indicating the current zoom position. When the zoom lens is at the wide-angle end, the icon 302 is colored completely in black only at the left end of the icon 303. In contrast, when the zoom lens is at the telephoto end, the icon 302 becomes an area that is colored completely in black in correspondence with substantially the entire zooming area 303. The icon 304 is a bar portion indicating a zoom position area that is unsuitable for macro AF shooting. When the zoom bar has this structure, the area 302 indicating the current zoom position is moved in accordance with a zooming operation, and is displayed so as to overlap the bar portion 304 indicating the area unsuitable for macro AF shooting. Therefore, the user can know that the current zoom position is unsuitable for the macro shooting.

A controlling operation required to carry out the embodiment will be described with reference to FIG. 8. FIG. 8 illustrates an exchanging operation between an operation/display controlling module for controlling the operation and display when zoom driving is carried out and a zoom driving controlling module for controlling the zoom driving. Here, the modules are included in the system control circuit 50 and implemented with, for example, circuits or computer programs. When the operation/display controlling module detects an operation of the zoom lever 70, a zoom drive start request is sent to the zoom drive controlling module in accordance with the direction of operation of the zoom lever in Step S2-1. Next, in Step S2-2, the zoom drive controlling module that has received the zoom drive start request starts the zoom driving, and periodically notifies the display controlling module of a change in the zoom position. When the operation/display controlling module receives the notification, in Step S2-3, the operation/display controlling module sends a zoom position obtaining request to the zoom drive controlling module. Next, in Step S2-4, the operation/display controlling module receives a zoom position notification from the zoom drive controlling module in order to obtain the zoom position. Next, in Step S2-5, the operation/display controlling module draws the zoom bar 300. Next, in Steps S2-6 and S2-7, the Steps S2-2 to S2-5 are repeated.

In Step S2-8, when the operation/display controlling module detects that the user has stopped operating the zoom lever, it sends a zoom drive stopping request to the zoom drive controlling module in order to end zoom lens movement. By repeating Step S2-2 to Step S2-5 (that is, Steps S2-6, S2-7, . . . ) until the zoom movement is ended from the start of the zooming, it is possible to update the drawing of the zoom bar 300.

Figure 10:
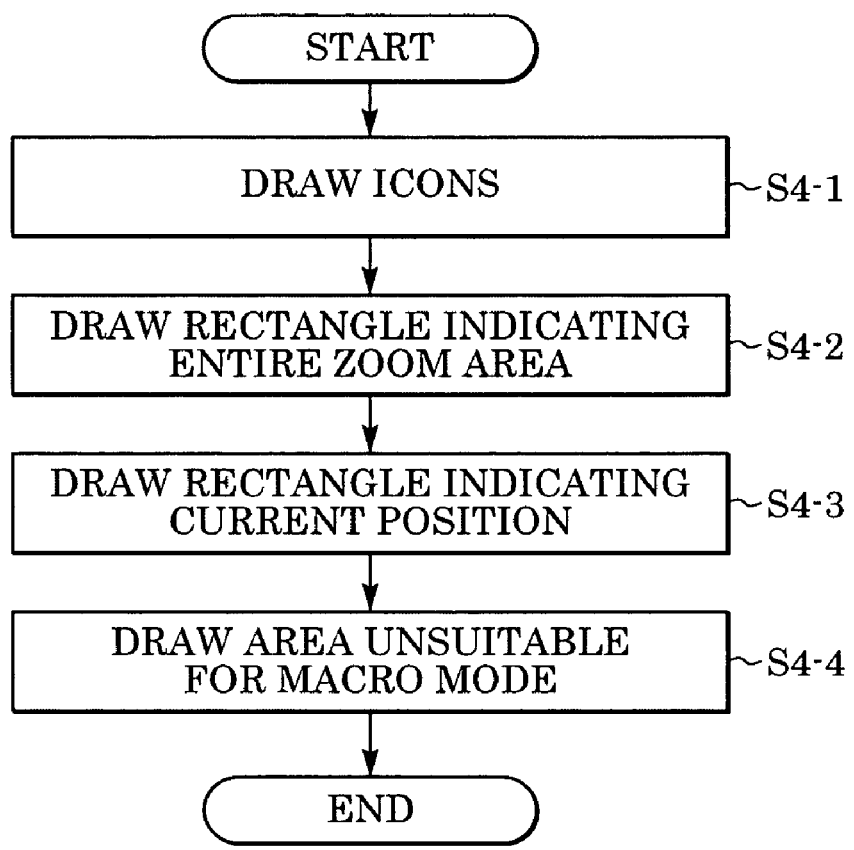
FIG. 10 shows the steps of zoom bar drawing.

The step of drawing the zoom bar (Step S2-5) will be described in detail with reference to FIG. 10. In the drawing process, in Substep S4-1, the icons 301 and 305 for indicating the wide-angle end and the telephoto end of the zoom bar, respectively, are drawn. Then, in Substep S4-2, the rectangle 303 indicating the entire zoom area is drawn. Next, in Step S4-3, the rectangle 302 indicating the current position is drawn. In Step S4-3, when the total number of zoom positions is X, the current position is XC, and the width of the rectangle indicating the entire zoom area is W, a width w of the rectangle to be drawn and an X coordinate where the drawing is started can be determined with respect to the entire zoom area by the following formulas.

$$x=0$$

$$w=W^* (XC/X)$$

Next, in Step S4-4, the rectangle 304 indicating the area unsuitable for macro shooting in the entire zoom area is drawn. When the position and the width of the rectangle 304 to be drawn are x-macro and w-macro, respectively, and the actual starting position and ending position of the area that is unsuitable for macro shooting are X0 and X1, respectively, the following formulas may be used to determine the starting position and the drawing width of the rectangle 304.

$$x\text{-macro}=W^* (X0/X)$$

$$w\text{-macro}=W^* ((X1-X0)/X)$$

Although the entire zoom bar is described as being drawn every time the zoom position changes, in order to increase the drawing speed, it is possible to change only a portion of the zoom bar that needs to be updated, that is, only the rectangle 302 indicating the current zoom position.

Figure 11:
FIG. 11 shows states in which macro icons are displayed.

Another embodiment may be realized as follows. When drawing an icon indicating the macro AF mode when the macro AF mode is set, the zoom drive controlling unit obtains the current zoom position in order to determine whether or not the current zoom position is in a previously obtained optical zoom area that is unsuitable for the macro AF mode. In accordance with the determination result, an icon 502 shown in FIG. 11 is drawn when the current zoom position is in the area that is unsuitable for macro controlling, or an icon 501 shown in FIG. 11 is drawn when the current zoom position is not in the area that is unsuitable for macro controlling.

The user can select and set either the macro AF mode or an ordinary AF mode by operating the operating unit 70. In the macro AF mode, macro AF shooting is successively performed on an object at close range, and automatic focusing can be carried out at close range. In the ordinary AF mode, ordinary AF shooting is performed on an object that is further away than a close range distance, and automatic focusing can be carried out within a close distance range. In the macro AF mode, there is an optical zoom area where focusing cannot be carried out because macro AF controlling cannot be carried out.

In the embodiment, the current optical zoom position is obtained and is displayed on the display unit. The optical zoom area where macro AF shooting cannot be carried out is obtained, and is displayed along with the current zoom position. More specifically, as shown in FIG. 9, when the macro AF mode is set, the zoom area that is not suitable for macro AF shooting is displayed along with the current zoom position, and, when the ordinary AF mode is set, the zoom area that is not suitable for macro AF shooting is not displayed. The user can move the shooting lens (optical zoom lens) 10 by operating the operating unit 70.

When information indicating that the macro AF shooting mode is set is displayed, and when macro AF shooting cannot be carried out at the current optical zoom position after obtaining information that the macro AF shooting cannot be carried out, the information indicating that the macro AF shooting cannot be carried out is added to the information indicating that the macro AF shooting mode is set. More specifically, as shown in FIG. 11, in displaying the information indicating that the macro AF mode is set when the macro AF mode is set, information indicating that the current zoom position is in the zoom area that is not suitable for the macro AF shooting is added when the current zoom position is in the zoom area.

The present invention is not limited thereto. When the macro AF mode is set, information regarding this may be displayed, and when the current zoom lens position is not in the zoom area that is suitable for macro AF shooting, information regarding this may be displayed.

Figure 12:
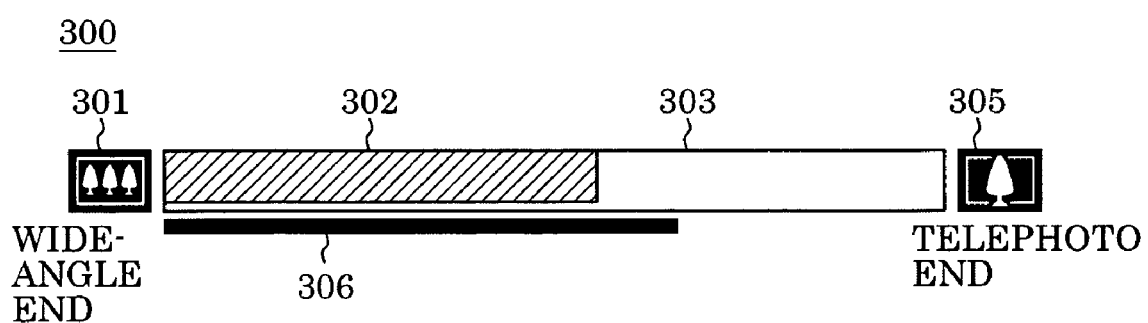
FIG. 12 illustrates a zoom bar.

As shown in FIG. 12, reference numeral 300 denotes the entire zoom bar which includes bar portions 301 to 305 displayed on the display unit 54 as in FIG. 9. The bar portions 301 to 305 are similar to those shown in FIG. 9. Reference numeral 306 denotes a bar portion indicating a zoom position area that is suitable for macro AF shooting. When the zoom bar has this structure, the area 302 indicating the current zoom position is moved in accordance with a zooming operation, and is displayed so as to overlap the bar portion 306 indicating the area that is suitable for macro AF shooting. Therefore, the user can know that the current zoom position is suitable for the macro shooting.

According to the embodiment, when moving the optical zoom lens and setting the macro AF mode, the user can know the current state and the relationship between the zoom lens and the macro AF mode, thereby preventing the user from improperly operating the image processor 100 or shooting an image that he/she does not intend to shoot. In addition, when there is an area that is unsuitable for macro shooting in the optical zoom area, the user can operate the device without becoming confused.

OTHER EMBODIMENTS

The embodiments may be realized when a computer executes a program. Means for supplying the program to the computer, such as a recording medium (for example, a CD-ROM) that records the program and that allows it to be read by the computer and a transmitting medium (for example, the internet) for transmitting the program may be applied in another embodiment of the present invention. A computer program product of, for example, the recording medium that records the program and that allows it to be read by the computer may be provided in another embodiment of the present invention. The program, the recording medium, the transmitting medium, and the computer program product are included in the category of the present invention. Examples of the recording medium are a flexible disc, a hard disc, an optical disc, a magneto-optical disc, a CD-ROM, a magnetic tape, a nonvolatile memory card, and ROM.

While the present invention has been described with reference to exemplary embodiments, such descriptions are given for illustrative purposes only in carrying out the present invention. Therefore, the exemplary embodiments are not to be construed as limiting the technical scope of the present invention. In other words, the present invention may be carried out in various other forms without departing from the technical concepts and main features thereof.

This application claims priority from Japanese Patent Application No. 2004-020405 filed Jan. 28, 2004 and Japanese Patent Application No. 2004-015783 filed Jan. 23, 2004, which are hereby incorporated by reference herein.

What is claimed is:

1. An imaging device provided with a first mode in which lens driving is capable of being carried out in a first range and a second mode in which the lens driving is capable of being carried out in a second range that is narrower than the first range, the imaging device comprising:
   a zoom lens;
   an imaging unit converting an object image obtained via the zoom lens into an image signal;
   an electronic zooming unit performing an electronic zooming operation on the image signal;
   a first displaying unit displaying an image subjected to the electronic zooming operation by the electronic zooming unit;
   a controlling unit, in a case where the zoom lens is outside the second range and the second mode is set, controlling the zoom lens to move into the second range, and controlling the electronic zooming unit to enlarge an image in order to display the enlarged image on the first displaying unit; and
   a second displaying unit displaying a movement position of the zoom lens,
   wherein, in a case where the zoom lens is outside the second range and the second mode is set, the controlling unit controls the zoom lens to move into the second range and controls the electronic zooming unit to enlarge an image in order to display the enlarged image on the first displaying unit, and
   wherein the movement position of the zoom lens displayed on the second displaying unit is changed in relation to the movement of the zoom lens.

2. An imaging method provided with a first mode in which lens driving is capable of being carried out in a first range and a second mode in which the lens driving is capable of being carried out in a second range that is narrower than the first range, the method comprising the following steps:
   an obtaining step of obtaining an object image with a zoom lens;
   an imaging step of converting the object image obtained in the obtaining step into an image signal;
   an electronic zooming step of performing electronic zooming on the image signal;
   a first displaying step of displaying an image that has been subjected to electronic zooming in the electronic zooming step;
   a controlling step of performing, in a case where the zoom lens is outside the second range and the second mode is set, a controlling operation so that the zoom lens is moved into the second range and an image is enlarged by the electronic zooming in the electronic zooming step in order to display the enlarged image in the first displaying step; and
   a second displaying step of displaying a movement position of the zoom lens,
   wherein the controlling step including changing a way in which the movement position of the zoom lens is displayed in the second displaying step in relation to the movement of the zoom lens.

3. An imaging device comprising:
   an optical zoom lens receiving an object image passing therethrough;
   an imaging unit converting the object image that has passed through the optical zoom lens into an electrical image signal;
   an auto-focusing unit automatically bringing an object into focus; and
   a displaying unit displaying a first bar indicating a current zoom position and a zoom area that is not suitable for auto-focusing at close range,
   wherein the displaying unit displays a second bar in parallel with the first bar, and wherein the second bar is shorter than the first bar.

4. A method for controlling an imaging device comprising an optical zoom lens receiving an object image passing therethrough, an imaging unit converting the object image that has passed through the optical zoom lens into an electrical image signal, an auto-focusing unit automatically bringing an object into focus, and a displaying unit displaying a first bar indicating a current zoom position and a zoom area that is not suitable for auto-focusing at close range, and displaying a second bar in parallel with the first bar, the method comprising:
   a first displaying step of displaying the first bar indicating the current zoom position; and
   a second displaying step of displaying the second bar in parallel with the first bar, the second bar being shorter than the first bar.

5. An image processor comprising:
   a zoom lens configured to obtain an object image by performing optical zooming, the zoom lens being movable within a first range;
   an imaging unit converting the object image obtained via the zoom lens into an image signal;

an electronic zooming unit performing an electronic zooming operation on the image signal;

a controlling unit, in a case where the zoom lens is outside a second range narrower than the first range, moving the zoom lens so as to be in the second range and controlling the electronic zooming unit to perform the electronic zooming operation; and a setting unit facilitating setting at least one of a first mode and a second mode, wherein, in a ease where the first mode is set and the zoom lens is outside the second range, the controlling unit moves the zoom lens into the second range and controls the electronic zooming unit to perform the electronic zooming operation, and wherein, in a case where the second mode is set and the zoom lens is outside the second range, the controlling unit does not move the zoom lens into the second range.

6. the image processor according to claim 5, wherein the controlling unit moves the zoom lens into the second range and controls the electronic zooming unit to perform the electronic zooming operation responsive to the zoom lens being outside the second range and the setting unit switching from the second mode to the first mode.

7. The image processor according to claim 5, further comprising a recording unit recording the image signal converted by the imaging unit, wherein the recording unit records the converted image signal in a first image area responsive to the setting unit setting the first mode, and wherein the recording unit records the converted image signal in a second image area less narrow than the first image area responsive to the setting unit setting the second mode.

8. The image processor according to claim 5, further comprising a displaying unit, wherein the displaying unit displays the converted image signal in a first image area responsive to the setting unit setting the first mode and displays the converted image signal in a second image area less narrow than the first image area responsive to the setting unit setting the second mode.

9. The image processor according to claim 5, further comprising a recording unit recording the image signal, wherein the recording unit records the image signal in a narrow central image area that does not include at least one of a peripheral image area and a portion of the image signal based on the narrow central image area.

10. An imaging device comprising:

an optical zoom lens receiving an object image passing therethrough;

an imaging unit converting the object image that has passed through the optical zoom lens into an electrical image signal;

an auto-focusing unit automatically bringing an object into focus;

a displaying unit displaying a first bar indicating a current zoom position and a zoom area that is not suitable for auto-focusing at close range; and a setting unit setting a first mode to perform auto-focusing at close range, wherein the displaying unit displays the current zoom position and the zoom area responsive to the setting unit setting the first mode.

11. The imaging device according to claim 10, wherein the displaying unit does not display the zoom area responsive to the setting unit canceling the first mode.

* * * * *